United States Patent [19]
Warrach

[11] 3,919,035
[45] Nov. 11, 1975

[54] METHOD OF BONDING STYRENE-BUTADIENE BLOCK COPOLYMERS TO OTHER SURFACES

[75] Inventor: Wolfgang Warrach, Willowdale, Canada

[73] Assignee: Stein, Hall, Limited, Jeffersontown, Ky.

[22] Filed: Oct. 10, 1973

[21] Appl. No.: 404,967

[52] U.S. Cl. ............... 156/315; 12/142 F; 36/19.5; 156/334; 260/879; 260/880 B; 428/519; 428/520
[51] Int. Cl.² .................. B32B 31/12; B32B 25/14; A43B 13/32
[58] Field of Search .................. 12/142 F; 36/19.5; 156/307, 308, 315, 334; 260/880 B, 879; 428/519, 520; 161/253, 254

[56] References Cited
UNITED STATES PATENTS

| | | | |
|---|---|---|---|
| 2,395,133 | 2/1946 | Mahoney et al. | 156/315 X |
| 2,669,535 | 2/1954 | Orr | 161/253 |
| 3,429,769 | 2/1969 | Ippen et al. | 161/217 |
| 3,562,356 | 2/1971 | Nyberg et al. | 260/876 |
| 3,621,077 | 11/1971 | Donat | 260/879 |
| 3,652,724 | 3/1972 | Shimomura et al. | 260/877 |
| 3,738,907 | 6/1973 | Bronstert et al. | 161/217 |
| 3,806,486 | 4/1974 | Endriss et al. | 260/31.2 N |

*Primary Examiner*—Douglas J. Drummond
*Assistant Examiner*—Robert A. Dawson
*Attorney, Agent, or Firm*—H. P. Price; K. A. Genoni; T. J. Morgan

[57] ABSTRACT

Styrene-butadiene block copolymer thermoplastic rubber compositions are bonded to other surfaces, such as polyvinyl chloride, leather, canvas and the like, by (1) coating the surface of the block copolymer composition and/or the other surface with a primer, which is an organic solvent solution of a graft copolymer of a styrene-butadiene block copolymer and an alkyl methacrylate, (2) applying an adhesive to both surfaces and (3) pressing the surfaces together for a time sufficient to obtain a suitable bond. This invention is of particular value in preparing shoes using styrene-butadiene block copolymer soling materials.

10 Claims, No Drawings

METHOD OF BONDING STYRENE-BUTADIENE BLOCK COPOLYMERS TO OTHER SURFACES

BACKGROUND OF THE INVENTION

The field to which this invention pertains is surface bonding wherein the particular adhesives contain synthetic resins.

Various methods have been proposed for bonding natural and synthetic rubbers to various compositions, e.g., leather, polyvinyl chloride, canvas, etc. Graft copolymers of methyl methacrylate with natural or synthetic rubbers have been used as the adhesive for uniting natural or synthetic rubbers with other materials, as described in German Auslegeschrift 1,084,408 and British patent 936,666. The use of such graft copolymers as a keying agent for uniting polyvinyl chloride with natural or synthetic rubbers is disclosed in British Pat. Nos. 845,052 and 905,032.

In the shoe industry, the shoe upper material is generally bonded to a soling material with an adhesive. Styrene-butadiene block copolymer thermoplastic rubbers have many properties which make them desirable for use as soling materials. However, in order to provide an adequate bond between these rubbers and the shoe uppers, it has been the practice in the industry to first chlorinate the rubber before applying the bonding adhesive. This chlorination procedure is undesirable because it is hazardous to employees, it is difficult to control and it is an added expense.

SUMMARY OF THE INVENTION

This invention pertains to an improved method for bonding styrene-butadiene block copolymers to various compositions. In one of its aspects it pertains to a graft-block copolymer composition which when used as a primer improves the adhesion between styrene-butadiene block copolymers and other compositions. In another aspect it pertains to graft-block copolymer compositions which when used as primers improve the adhesion between styrene-butadiene block copolymers and polyvinyl chloride.

By this invention styrene-butadiene block copolymer thermoplastic rubber compositions are bonded to surfaces by coating the block copolymer surface and/or the other surface with a primer, applying an adhesive to the surfaces and pressing the surfaces together for a time and at a pressure sufficient to obtain adequate adhesion. The primer composition is comprised of an organic solvent solution of a graft copolymer of a styrene-butadiene block copolymer thermoplastic rubber and an alkyl methacrylate having 1 to 4 carbon atoms in the alkyl group and wherein the graft copolymer contains about 30 to 90% by weight, based on the weight of the graft copolymer, of block copolymer and about 70 to 10% by weight alkyl methacrylate.

DESCRIPTION OF THE INVENTION

The soling materials used in this invention are styrene-butadiene block copolymer thermoplastic rubbers as described in U.S. Pat. No. 3,265,765, which is hereby incorporated by reference. Such rubbers are not random copolymers of styrene and butadiene but are made up of blocks of polystyrene-polybutadiene-polystyrene. The polystyrene blocks have molecular weights of from about 5,000 to about 125,000, preferably between about 8,000 and 45,000, whereas the polybutadiene blocks have molecular weights between about 15,000 and about 250,000, preferably from about 35,000 to about 150,000. The copolymers can contain about 20 to 40% by weight of polystyrene and from 80 to 60% by weight polybutadiene, preferably from 25 to 35% polystyrene and from 75 to 65% polybutadiene.

The upper materials used in this invention can be any upper material which is conventionally used in the shoe industry as described in "Encyclopedia of Polymer Science and Technology," Volume 8, pages 210–228, Interscience Publishers, New York (1968), which is hereby incorporated by reference. Examples of such shoe upper materials include leather, poromeric polymers (microporous, coriaceous sheet material based on urethane polymers and polyester fibers), vinyl coated fabrics which includes standard, expanded and patent or shiny types, nylon, velvets, plastic mesh, canvas and the like. Particularly useful materials in this invention are the vinyl coated fabrics which are coatings of polyvinyl chloride or copolymers of vinyl chloride with vinyl acetate, vinylidene chloride or vinyl butyral on various fabrics. Polyvinyl chloride upper materials (which include copolymers of vinyl chloride with vinyl acetate, vinylidene chloride or vinyl butyral containing at least 50% by weight of vinyl chloride) are described in "Encyclopedia of Polymer Science and Technology," Volume 6, page 472–473, Interscience Publishers, New York (1967), which is hereby incorporated by reference.

The primer of this invention is a solution in an organic solvent of a graft copolymer of a styrene-butadiene block copolymer and an alkyl methacrylate. The block copolymers used in making the primer are those previously described. The preferred block copolymer is one which has the same composition as the soling material with which it will be used in conjunction. Suitable alkyl methacrylates are those which contain 1 to 4 carbons in the alkyl group. The preferred alkyl methacrylate is methyl methacrylate. The graft copolymers contain about 30 to 90% by weight of styrene-butadiene block copolymer in the backbone and have grafted thereon about 70 to 10% by weight of alkyl methacrylate, the percentages being based on total weight of graft copolymer. The primer solution contains, based on the total solution weight, about 2–14% by weight graft copolymer and, preferably, 6–12% by weight of graft copolymer. The primer solutions can also contain residual monomer and homopolymers of the methacrylate ester. Generally, the primer will contain, based on total solution weight, about 0–5% by weight, most generally 1–4% by weight, of residual alkyl methacrylate monomer. The amount of alkyl methacrylate usually present in the primer solution is about 0–20% by weight, most usually 1–10% by weight, based on the weight of graft copolymer.

The solvents used in the primer solutions of this invention are, preferably, aromatic hydrocarbons, e.g., benzene, toluene, xylene and the like. Mixtures of aromatic hydrocarbons and aliphatic hydrocarbons, e.g., pentane, hexane, the naphthas, mineral spirits and the like can also be used. Polar solvents, such as ketones, esters, and alcohols, can also be used in admixture with the aromatic hydrocarbons if so desired.

In some cases it may be desirable to add dyes or pigments to the primer solution to produce decorative coatings that can be preapplied to the styrene-butadiene block copolymer soling material. For example, shoe soles and heels can be coated with colored or pigmented primer, and can subsequently be bonded to the shoe uppers.

A variety of adhesives may be used in combination with the primer of this invention. Polyurethane cements, i.e., solutions of thermoplastic polyurethanes made from hydroxy-terminated polyesters and polyethers reacted with less than an equivalent amount of diisocyanates, are emininently suitable, particularly when the primer is applied to the thermoplastic soling. Polyurethanes useful in this invention are described in "Polyurethanes, Chemistry and Technology," Part II, by Saunders and Frisch, Interscience Publishers, New York (1964). A preferred non-urethane type adhesive is an organic solution of a styrene-butadiene block copolymer, and a tackifier. The styrene-butadiene block copolymer is the same as those previously described herein. The tackifier includes coumarone resins, indene resins, coumarone-indene resins, terpene resins, terpene-phenolic resins, rosin, rosin esters, diene-olefin aliphatic hydrocarbon resins and the like. The adhesive composition should also contain a small amount of an antioxidant, for example 2,2-methylene bis(4-methyl-6-tertiary butyl phenol), 4,4-methylene-bis(2,6-di-t-butyl phenol) and tris(di-t-butyl-p-hydroxybenzyl)-trimethylbenzene. Solvents used in these adhesives are those organic solvents previously described for use in making the primer solutions. The preferred adhesive composition contains 15 to 30% by weight of a styrene-butadiene block copolymer, 30 to 40% by weight naphtha, 15 to 25% by weight toluene and 15 to 25% by weight tackifier. The amount of antioxidant based on total adhesive weight will range from about 0.1 to about 3% by weight.

The primers useful in this invention are prepared as follows. The alkyl methacrylate and the styrene-butadiene block copolymer are charged to a reaction vessel and dissolved in a suitable solvent such as toluene. A small amount of a free radical producing catalyst, for example from 0.5 to 2.0% by weight, based on the monomer, is added to the solution. Nitrogen purge is applied, and the polymerization is carried out at a temperature of from 50°C. to 100°C. for a time sufficient to obtain the desired degree of reaction. This time will vary from about 3 to 16 hours, preferably from 5 to 10 hours, depending on the temperature, the amount of catalyst employed and the degree of reaction desired. It is preferred to leave the residual monomer in the product to enhance adhesion. It can, however, if desired, be stripped off.

Suitable solvents include toluene, xylene, toluene in naphtha, toluene in methyl ethyl ketone and the like.

Suitable, free radical producing catalysts include benzoyl peroxide, cumenehydroperoxide, tertiary butylhydroperoxide, diisopropylbenzene peroxide and the like.

Polyvinyl chloride is bonded to styrene-butadiene block copolymers as follows. The surface of the polyvinyl chloride is uniformly coated with the primer described herein. The solvent in the primer is allowed to evaporate. This can be done at room temperature or at slightly elevated temperatures of from 80° to 150°F. for a time of from about 1 minute to 10 minutes to speed the evaporation. A suitable adhesive is then applied to the coated surface and, preferably, also to the corresponding surface of the styrene-butadiene block copolymer. The adhesive is allowed to dry for a period of from 15 to 60 minutes at room temperature or slightly elevated temperatures at shorter drying times. The polyvinyl chloride and the styrene-butadiene block copolymer are then pressed together at a pressure of from 50 to 200 psi for a time sufficient to assure adequate bonding. This time will ordinarily be in the range of from 5 to 20 seconds. This step may be performed at room temperature or at slightly elevated temperatures. Vulcanization is not required for adequate bonding. It is preferred that the bonding be performed at temperatures below 80°C., most preferably at room temperature, but the temperature may be as high as 100°C. Temperatures above 80°C. are not desirable because the soling material often softens at these temperatures. It is desirable to activate the adhesive with heat, e.g., infra-red radiation, for a short period of time prior to pressing the two surfaces together.

The following Examples demonstrate the efficacy of the instant invention. Parts and percentages when used are parts and percentages by weight.

EXAMPLE I

A primer of this invention is prepared as follows. 400 grams of a styrene-butadiene block copolymer (10% by weight in toluene), having a specific gravity of 0.94, a solution viscosity at 23°C. and at 25% by weight in toluene of 4,000 cps., a hardness, Shore A, of 71, a tensile strength of 4,600 psi and an elongation of 880%, containing about 30% polystyrene and 70% polybutadiene and having a molecular weight of about 120,000, 170 grams of toluene, 50 grams of methyl methacrylate and 27 grams of a 2% benzoyl peroxide solution in toluene are charged to a polymerization vessel. Polymerization is carried out at 80°C. under nitrogen purge for 8 hours. The total solids of the batch is from 11 to 12%, which corresponds roughly to 60% conversion. If higher solids content is desirable, the solvent can be stripped off. A portion of this product is diluted with a large volume of an acetone-methyl ethyl ketone mixture (1:1 by weight) without precipitating the styrene-butadiene block copolymer. This is an indication of the success of the grafting.

The remaining portion of the product is diluted to 6% total solids using toluene as a diluent. The efficacy of this primer is illustrated in the following Examples.

EXAMPLE II

Canvas is bonded to polyvinyl chloride shoe upper material as follows. The primer is brushed on to the polyvinyl chloride upper material and after 15 minutes drying at room temperature is over-coated with an adhesive which is a solution of 17% of the styrene-butadiene block copolymer described in Example 1, 0.3% of an antioxidant, 2,2-methylene bis(4-methyl-6-tertiary butyl phenol), 35.8% naphtha, 23.5% toluene, and 23.4% of a coumarone-indene resin having a melting point of 100°C. (Neville R-16-A). After 1 hour's drying, the coated polyvinyl chloride is bonded to a piece of canvas which has also been coated with the same adhesive. The coated surfaces are briefly heated with infra-red radiation to activate the adhesive. The two surfaces are then pressed together at a pressure of approximately 150 psi for approximately 12 seconds.

This exact procedure is repeated with the exception that the primer is not applied to the surface. The comparative results are shown in the following Table.

TABLE I

| Canvas to PVC Upper Material | Peel Strength Lbs./In. | | | |
|---|---|---|---|---|
| | Green | 3 Days | 10 Days | 30 Days |
| No primer/Adhesive | 4.5 | 9.0 | 8.0 | 8.0 |
| Primer/Adhesive | 5.5 | 19.0 | 19.0 | 22.5 |

EXAMPLE III

A thermoplastic soling material, the butadiene-styrene block copolymer described in Example 1, is bonded to a polyvinyl chloride shoe upper material as follows. The primer of Example I is brushed on to the shoe upper material and allowed to dry for 20 minutes at room temperature. An adhesive as described in Example II is applied to the coated surface and to the surface of the soling material. The adhesive is allowed to dry for approximately 1 hour at room temperature. The adhesive is then activated for approximately 1 minute with infra-red radiation and the shoe upper and soling material are then pressed together at a pressure of approximately 150 psi for approximately 12 seconds. The bond is strong enough so that the soling material will tear before the bond.

EXAMPLE IV

A thermoplastic soling material as described in Example I is bonded to a polyvinyl chloride shoe upper material as follows. The primer of Example I is brushed on to thermoplastic soling and allowed to dry for 20 minutes at room temperature. A polyurethane cement (20% Estane 5713, a tolylene diisocyanate-hydroxy terminated polyester polyurethane resin having a Shore hardness of 42D and a viscosity of 800–1300 cps. at 15% solids in tetrahydrofurane and at 25°C., 25% tetrahydrofuran and 55% methyl ethyl ketone) is applied to the coated surfaces and to the surface of the upper material. The adhesive is allowed to dry for approximately 1 hour at room temperature. The adhesive is then activated for approximately 1 minute with infra-red radiation and the shoe upper and soling material are then pressed together at a pressure of approximately 150 psi for approximately 10 seconds. The bond is strong enough so that the soling material will tear before the bond.

Other shoe upper materials, e.g., leather or canvas can be used in place of the polyvinyl chloride with equally good results.

EXAMPLE V

A primer of this invention is prepared as follows. 400 grams (10% solution in toluene) of a styrene-butadiene block copolymer containing about 40% polystyrene and 60% polybutadiene and having a molecular weight of approximately 100,000, 170 grams of toluene, 50 grams of ethyl methacrylate, and 27 grams of benzoyl peroxide are charged to a polymerization vessel. Polymerization is carried out at 80°C. under nitrogen purge for 8 hours.

The product is diluted to 6% total solids using toluene as a diluent. A polyvinyl chloride shoe upper material is bonded to a thermoplastic soling material, a styrene-butadiene block copolymer containing about 30% polystyrene and 70% polybutadiene. The primer is brushed on to the thermoplastic soling and allowed to dry for approximately 15 minutes at 100°F. A polyurethane cement is applied to the coated surface and to the surface of the upper material. The adhesive is allowed to dry for approximately 1 hour at room temperature. The adhesive is then activated for approximately 1 minute with infra-red radiation and the shoe upper and soling material are then pressed together at a pressure of approximately 150 psi for approximately 12 seconds.

Primers are prepared by grafting methyl methacrylate on to materials other than styrene-butadiene block copolymers such as natural rubber. These primers are not as effective for bonding polyvinyl chloride shoe upper material to styrene-butadiene block copolymer soling materials.

This specification contains a description of the invention and what are now considered to be at best embodiments. It should be understood, however, that the invention can be practiced otherwise than as specifically described, within the scope of the appended claims.

What is claimed is:

1. A method of bonding a styrene-butadiene block copolymer thermoplastic rubber composition to a surface which comprises:

A. coating the block copolymer thermoplastic rubber composition and the other surface with a primer;
   B. applying an adhesive to the coated surfaces, and
   C. pressing the surfaces together at a pressure and for a time sufficient to obtain adequate adhesion, wherein the primer is comprised of an organic solvent solution of a graft copolymer of a styrene-butadiene block copolymer thermoplastic rubber and an alkyl methacrylate having 1 to 4 carbon atoms in the alkyl group and wherein the graft copolymer contains about 30 to 90% by weight block copolymer and 70 to 10% by weight alkyl methacrylate.

2. A method of bonding a styrene-butadiene block copolymer thermoplastic rubber soling material to a polyvinyl chloride shoe upper material which comprises:

A. coating a surface of the polyvinyl chloride shoe upper material with a primer;
   B. applying an adhesive to the coated surface of the polyvinyl chloride and to the soling material, and
   C. pressing the surfaces together at a pressure and for a time sufficient to obtain adequate adhesion, wherein the primer is comprised of an organic solvent solution of a graft copolymer of a styrene-butadiene block copolymer thermoplastic rubber and an alkyl methacrylate having 1 to 4 carbon atoms in the alkyl group and wherein the graft copolymer contains about 30 to 90% by weight block copolymer and 70 to 10% by weight alkyl methacrylate.

3. The method of claim 2 wherein the primer contains 2–14% by weight, based on the total primer weight, of the graft copolymer, 0–5% by weight residual alkyl methacrylate monomer and 0–20% by weight, based on the graft copolymer weight, of a homopolymer of the alkyl methacrylate.

4. The method of claim 2 wherein the adhesive is an organic solvent solution of a styrene-butadiene block copolymer and a tackifier.

5. The method of claim 2 wherein the bonding is performed at a temperature of from 20°C. to 80°C.

6. A method of bonding a styrene-butadiene block copolymer thermoplastic rubber soling material to a shoe upper material which comprises:

A. coating a surface of the soling material with a primer;

B. applying an adhesive to the coated surface of the soling material and to a surface of the shoe upper material; and C. pressing the surfaces together at a pressure and for a time sufficient to obtain adequate adhesion, wherein the primer is comprised of an organic solvent solution of a graft copolymer of a styrene-butadiene block copolymer thermoplastic rubber and an alkyl methacrylate having 1 to 4 carbon atoms in the alkyl group and wherein the graft copolymer contains about 30 to 90% by weight block copolymer and 70 to 10% by weight alkyl methacrylate.

7. The method of claim 6 wherein the primer contains 2–14% by weight, based on the total primer weight, of the graft copolymer, 0–5% by weight residual alkyl methacrylate monomer and 0–20% by weight, based on the graft copolymer weight, of a homopolymer of the alkyl methacrylate.

8. The method of claim 6 wherein the shoe upper material is polyvinyl chloride, leather, or canvas.

9. The method of claim 6 wherein the adhesive is a polyurethane cement.

10. The method of claim 6 wherein the bonding is performed at a temperature of from 20°C. to 80°C.

* * * * *